United States Patent
Tseng et al.

(10) Patent No.: US 10,275,065 B2
(45) Date of Patent: Apr. 30, 2019

(54) MULTI-SENSING SYSTEM, PORTABLE ELECTRONIC DEVICE AND TOUCH-SENSING METHOD

(71) Applicant: HTC Corporation, Taoyuan (TW)

(72) Inventors: Chun Tseng, Taoyuan (TW); Yi-Ting Liu, Taoyuan (TW); Shih-Po Chien, Taoyuan (TW); CHin-Kuei Wen, Taoyuan (TW); Jui-Liang Chen, Taoyuan (TW); Yu-Jing Liao, Taoyuan (TW); Chun-Lung Huang, Taoyuan (TW); Yang-Lin Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 70 days.

(21) Appl. No.: 15/451,418

(22) Filed: Mar. 7, 2017

(65) Prior Publication Data
US 2018/0260063 A1 Sep. 13, 2018

(51) Int. Cl.
*G06F 3/041* (2006.01)
*G06F 3/044* (2006.01)
*G06F 1/16* (2006.01)

(52) U.S. Cl.
CPC .......... *G06F 3/0414* (2013.01); *G06F 1/1637* (2013.01); *G06F 3/044* (2013.01)

(58) Field of Classification Search
CPC ...... G06F 3/044; G06F 3/0414; G06F 1/1626; G06F 1/1637
USPC ................................................. 345/173, 174
See application file for complete search history.

(56) References Cited

U.S. PATENT DOCUMENTS

| 2015/0091859 A1* | 4/2015 | Rosenberg | G06F 3/044 345/174 |
| 2015/0370376 A1* | 12/2015 | Harley | G06F 3/0414 345/174 |
| 2017/0269756 A1* | 9/2017 | Wang | G06F 3/0414 |

FOREIGN PATENT DOCUMENTS

| CN | 102138120 | 7/2011 |
| CN | 105183257 | 12/2015 |
| CN | 105190495 | 12/2015 |
| CN | 105224126 | 1/2016 |

OTHER PUBLICATIONS

"Office Action of Taiwan Counterpart Application," dated Oct. 30, 2017, p. 1-p. 9, in which the listed references were cited.

* cited by examiner

*Primary Examiner* — Calvin C Ma
(74) *Attorney, Agent, or Firm* — JCIPRNET

(57) ABSTRACT

A multi-sensing system, a portable electronic device, and a touch-sensing method are provided. The multi-sensing system includes a sensing sheet and a carrier. The sensing sheet includes a substrate, and a touch-sensing circuit and a force-sensing circuit disposed on the substrate, wherein an orthogonal projection of the force-sensing circuit on the substrate and an orthogonal projection of the touch-sensing circuit on the substrate are misaligned from each other. The carrier has a carrying space and a carrying shoulder adjacent to the carrying space, wherein the carrier carries the sensing sheet with the carrying shoulder. The carrying space is used to accommodate a display element. The touch-sensing circuit is located above the display element.

12 Claims, 5 Drawing Sheets

MULTI-SENSING SYSTEM, PORTABLE ELECTRONIC DEVICE AND TOUCH-SENSING METHOD

BACKGROUND OF THE INVENTION

Field of the Invention

The invention relates to a multi-sensing system, a portable electronic device, and a touch-sensing method thereof, and in particular, a multi-sensing system for touch sensing and force sensing, a portable electronic device, and a touch-sensing method for touch sensing and force sensing.

Description of Related Art

Currently, one of the most common force-sensing systems adopts a capacitance structure as the basic framework of the sensing system. Therefore, this system is also known as a capacitance-type force-sensing system. In brief, in the design of this type of force-sensing system, electrodes are disposed respectively on two opposite substrates (i.e., upper and lower substrates), and a medium (e.g., a sponge or air) is filled in between the two opposite electrodes (i.e., upper and lower electrodes) to form a capacitance structure. When a force is applied to the force-sensing system from the external environment, a gap between the upper and lower substrates is reduced accordingly. A distance between the two opposite electrodes is also reduced, thereby changing a capacitance value between the two electrodes. Therefore, from a variation in the capacitance value between the two electrodes, the force-sensing system can infer a magnitude of the force applied from the external environment. Nowadays, many developers incorporate force-sensing systems into electronic devices (e.g., mobile phones or tablet computers), which have become indispensable in our daily lives, so that a user is provided with more operation options for getting the electronic devices to execute functions desired by the user.

FIG. 1 is a cross-sectional schematic diagram illustrating a conventional sensing system. Referring to FIG. 1, a conventional sensing system 100 is disposed with a carrier 120, a buffer, 140, a force-sensing sheet 112, a display element 170, and a touch-sensing sheet 114, from a bottom to a top. The force-sensing sheet 112 includes a force-sensing circuit 116 forming a capacitance with a grounding electrode 130 disposed on the carrier 120. When the user applies an external force to the sensing system 100, a distance D between the force-sensing circuit 116 and the grounding electrode 130 varies. Accordingly, the force-sensing sheet 112 can sense a capacitance variation value and achieve the purpose of force sensing.

However, when the foregoing conventional sensing system is applied to a portable electronic device, the overall thickness of the device is significantly increased due to the force-sensing sheet 112. Moreover, additionally disposing the individual force-sensing sheet 112 also increases the costs for the portable electronic device. Therefore, how to incorporate the force-sensing system into the limited space of the portable electronic device has become one main issue of research for developers.

SUMMARY OF THE INVENTION

The invention provides a multi-sensing system, a portable electronic device, and a touch-sensing method that are capable of solving the issue that the portable electronic devices have overly high manufacturing costs and are overly thick in size.

The multi-sensing system of the invention includes a sensing sheet and a carrier. The sensing sheet includes a substrate, and a touch-sensing circuit and a force-sensing circuit disposed on the substrate, wherein an orthogonal projection of the force-sensing circuit on the substrate and an orthogonal projection of the touch-sensing circuit on the substrate are misaligned from each other. The carrier has a carrying space and a carrying shoulder adjacent to the carrying space, wherein the carrier carries the sensing sheet with the carrying shoulder. The carrying space is used to accommodate a display element, and the touch-sensing circuit is located above the display element.

The portable electronic device of the invention includes a display element and a multi-sensing system. The multi-sensing system includes a sensing sheet and a carrier. The sensing sheet includes a substrate, and a touch-sensing circuit and a force-sensing circuit disposed on the substrate, wherein an orthogonal projection of the force-sensing circuit on the substrate and an orthogonal projection of the touch-sensing circuit on the substrate are misaligned from each other. The carrier has a carrying space and a carrying shoulder adjacent to the carrying space, wherein the carrier carries the sensing sheet with the carrying shoulder. The carrying space is used to accommodate the display element, and the touch-sensing circuit located above the display element.

The touch-sensing method of the invention for touch-sensing the foregoing portable electronic device includes the following steps: determining a touch position touched by a user on the display element according to a sensing result of the touch-sensing circuit; and executing one of a plurality of commands corresponding to the touch position according to a sensing result of the force-sensing circuit.

In an embodiment of the invention, the multi-sensing system further includes a grounding electrode and a first buffer, disposed between the force-sensing circuit and the carrying shoulder, wherein the first buffer is located between the force-sensing circuit and the grounding electrode.

In an embodiment of the invention, the multi-sensing system further includes a second buffer disposed between the grounding electrode and the carrying shoulder.

In an embodiment of the invention, the grounding electrode is built in the carrying shoulder, wherein the first buffer is located between the force-sensing circuit and the carrying shoulder.

In an embodiment of the invention, the carrying shoulder is located at two opposite sides of the carrying space.

In an embodiment of the invention, the carrying shoulder surrounds the carrying space.

In an embodiment of the invention, the multi-sensing system further includes a glass cover plate, wherein the sensing sheet is disposed on the glass cover plate, and the sensing sheet is located between the glass cover plate and the carrying shoulder.

In an embodiment of the invention, a material of the carrier is a metal.

In an embodiment of the invention, the portable electronic device further includes an optical adhesive disposed between the sensing sheet and the display element.

In light of the above, in the multi-sensing system, the portable electronic device, and the touch-sensing method of the invention, the force-sensing circuit and the touch-sensing circuit are integrated on one single substrate. Therefore, the manufacturing costs for the portable electronic device are lowered and the size is reduced.

To provide a further understanding of the aforementioned and other features and advantages of the invention, exemplary embodiments, together with the reference drawings, are described in detail below.

DESCRIPTION OF THE EMBODIMENTS

Figure 1:
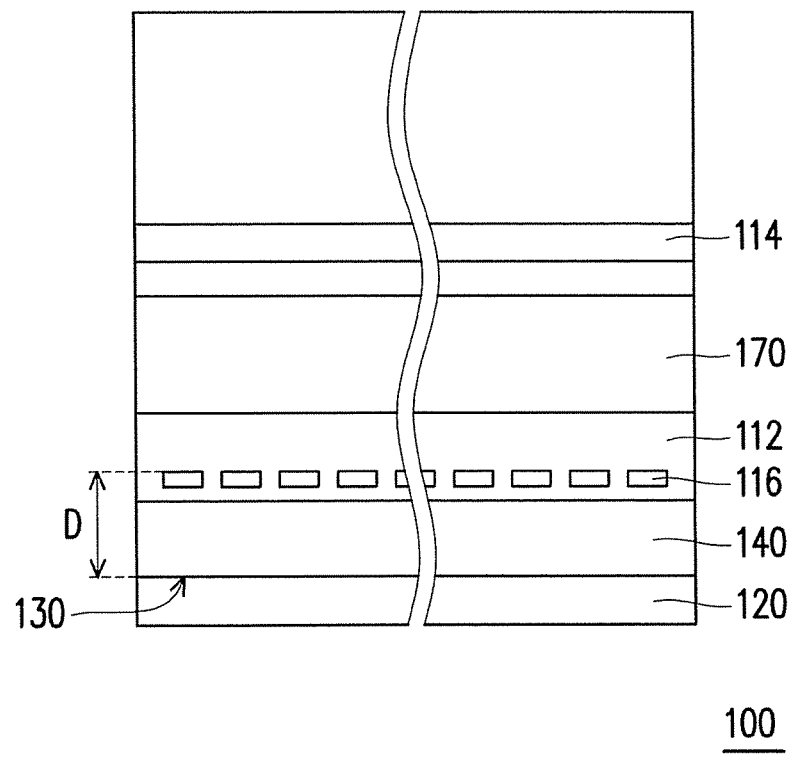
FIG. 1 is a cross-sectional schematic diagram illustrating a conventional sensing system.

Reference will now be made in detail to the exemplary embodiments of the disclosure, examples of which are illustrated in the accompanying drawings. Wherever possible, the same reference numbers are used in the drawings and the description to refer to the same or like parts. Theses exemplary embodiments are only a part of the disclosure, and the disclosure does not disclose all of the implementations. More precisely, these exemplary embodiments are only examples of the device in the claims of the disclosure.

Figure 2:
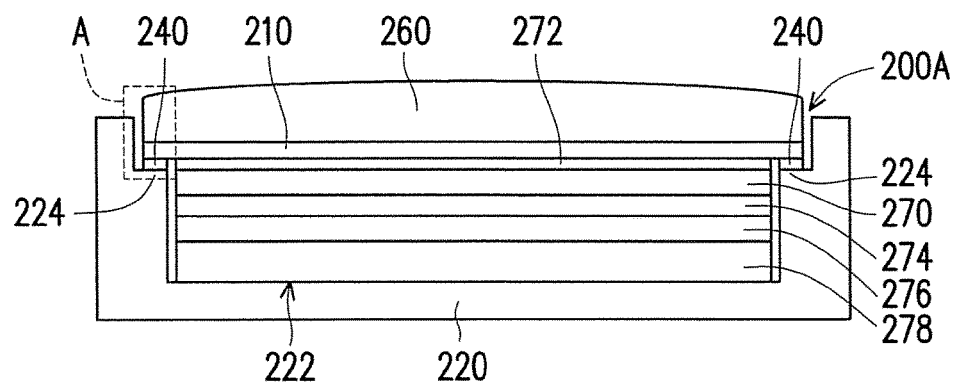
FIG. 2 is a cross-sectional schematic diagram illustrating a portable electronic device according to an embodiment of the invention.
Figure 3:
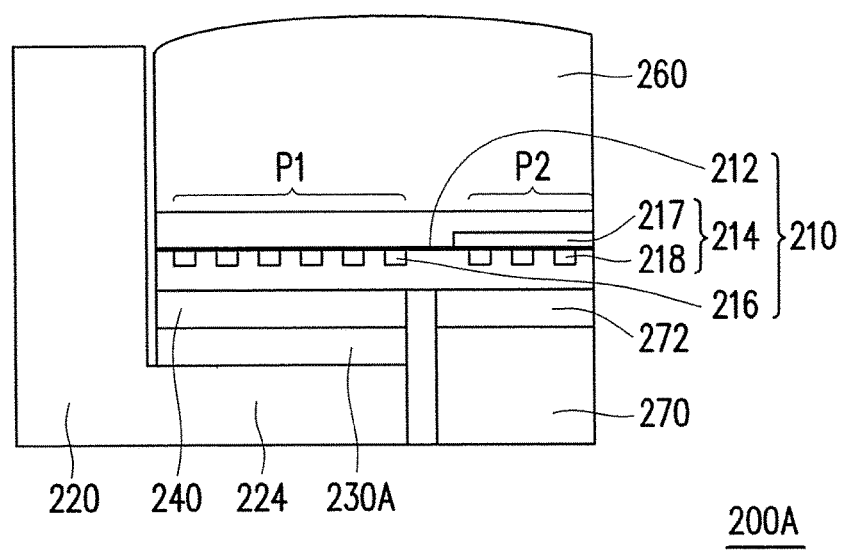
FIG. 3 is a partially enlarged cross-sectional diagram illustrating a multi-sensing system of FIG. 2.

FIG. 2 is a cross-sectional schematic diagram illustrating a portable electronic device according to an embodiment of the invention. FIG. 3 is a partially enlarged cross-sectional diagram illustrating a multi-sensing system of FIG. 2. Referring to FIG. 2 and FIG. 3, a portable electronic device 300 of the present embodiment has a sensing function adapted for a user to perform a command operation by touching. Moreover, the portable electronic device 300 is, for example, a mobile phone or a tablet computer, but the invention is not limited hereto.

The portable electronic device 300 of the present embodiment includes a display element 270 and a multi-sensing system 200A of an embodiment of the invention. The multi-sensing system 200A includes a sensing sheet 210 and a carrier 220. The sensing sheet 210 includes a substrate 212, and a touch-sensing circuit 214 and a force-sensing circuit 216 disposed on the substrate 212, wherein an orthogonal projection P1 of the force-sensing circuit 216 on the substrate 212 and an orthogonal projection P2 of the touch-sensing circuit 214 on the substrate 212 are misaligned from each other. As FIG. 3 is the partially enlarged cross-sectional diagram of the multi-sensing system 210, only part of the orthogonal projection P2 is shown. The carrier 220 has a carrying space 222 and a carrying shoulder 224 adjacent to the carrying space 222, wherein the carrier 220 carries the sensing sheet 210 with the carrying shoulder 224. The force-sensing circuit 216 is located above the carrying shoulder 224. For example, the force-sensing circuit 216 is located between the substrate 212 and the carrying shoulder 224, but the invention is not limited hereto. The carrying space 222 accommodates the display element 270. The touch-sensing circuit 214 is located above the display element 270. Specifically, the touch-sensing circuit 214 is arranged at a location in the substrate 212 of the sensing sheet 210 corresponding to the carrying space 222 of the carrier 220, and the force-sensing circuit 216 is arranged at a location in the substrate 212 corresponding to the carrying shoulder 224 of the carrier 220. Therefore, the orthogonal projection P1 of the force-sensing circuit 216 on the substrate 212 and the orthogonal projection P2 of the touch-sensing circuit 214 on the substrate 212 do not overlap and are misaligned from each other. Accordingly, the force-sensing circuit 216 and the touch-sensing circuit 214 are integrated on the same substrate 212, which lowers manufacturing costs for the portable electronic device 300 and reduces a size thereof.

In an embodiment of the invention, the portable electronic device 300 further includes a glass cover plate 260, wherein the sensing sheet 210 is disposed on the glass cover plate 260, and the sensing sheet 210 is located between the glass cover plate 260 and the carrying shoulder 224. Therefore, the glass cover plate 260 can protect the sensing sheet 210 located between the glass cover plate 260 and the carrying shoulder 224. Moreover, a magnitude of a force applied by the user on the glass cover plate 260 can also be transmitted to the sensing sheet 210.

In an embodiment of the invention, a material of the carrier 220 is, for example, a metal. The carrier 220 using the metal as the material directly forms a capacitance with the force-sensing circuit 216 in the sensing sheet 210. In other situations, the material of the carrier 220 may also be other materials such as a general plastic, for example, and the invention is not limited hereto.

In an embodiment of the invention, the portable electronic device 300 further includes an optical adhesive 272 disposed between the sensing sheet 210 and the display element 270. Specifically, the optical adhesive 272 is uniformly coated between the display element 270 and the sensing sheet 210 to attach the display element 270 and the sensing sheet 210 together. Due to the presence of the optical adhesive 272, the portable electronic device 300 does not have an issue of surface reflection and exhibits excellent display effect.

In addition, the portable electronic device 300 further optionally includes a support 274, a circuit board 276, and a battery 278. The battery 278 is disposed in the carrying space 222. The circuit board 276 is disposed on the battery 278, and the battery 278 is located between the circuit board 276 and the carrier 220. The support 274 is disposed between the circuit board 276 and the display element 270 to support the display element 270 and separate the circuit board 276 and the display element 270.

Referring to FIG. 3 again, the multi-sensing system 200A of an embodiment of the invention further includes a grounding electrode 230A and a first buffer 240. The grounding electrode 230A and the first buffer 240 are disposed between the force-sensing circuit 216 and the carrying shoulder 224. The first buffer 240 is located between the force-sensing circuit 216 and the grounding electrode 230A. The first buffer 240 is, for example, a double-sided adhesive tape or another material having elasticity, but the invention is not limited hereto. After the user applies the force to the multi-sensing system 200A, the first buffer 240 located between the force-sensing circuit 216 and the grounding electrode 230A is subjected to the force and is compressed. Therefore, a distance between the force-sensing circuit 216 and the grounding electrode 230A varies, such that the force-sensing circuit 216 senses a capacitance variation value between the force-sensing circuit 216 and the grounding electrode 230A according to the variation. Specifically, after the user applies the force to the multi-sensing system 200A, the force-sensing circuit 216 shifts towards the carrying shoulder 224, such that the distance between the force-sensing circuit 216 and the grounding electrode 230A disposed on the carrying shoulder 224 is shortened and causes the capacitance value to vary. Accordingly, the multi-sensing system 200A can execute one of a plurality of commands corresponding to a touch position according to a sensing result of the force-sensing circuit 216. Since the force-sensing circuit 216 and the touch-sensing circuit 214 are simultaneously manufactured in one single sensing sheet 210, the manufacturing costs for the multi-sensing system 200A are lowered, and an issue of being not light and thin in a conventional portable electronic device is solved.

In the present embodiment, the touch-sensing circuit 214 includes, for example, a driving electrode 217 and a sensing electrode 218 for sensing an electrical variation resulting from a touch operation performed by the user on the display element 270. According to a sensing result of the touch-sensing circuit 214, the multi-sensing system 200A determines a position of the touch operation performed by the user on the display element 270. With a different sensing result of the force-sensing circuit 216, one of the plurality of commands corresponding to the position of the touch operation is triggered.

Figure 4:
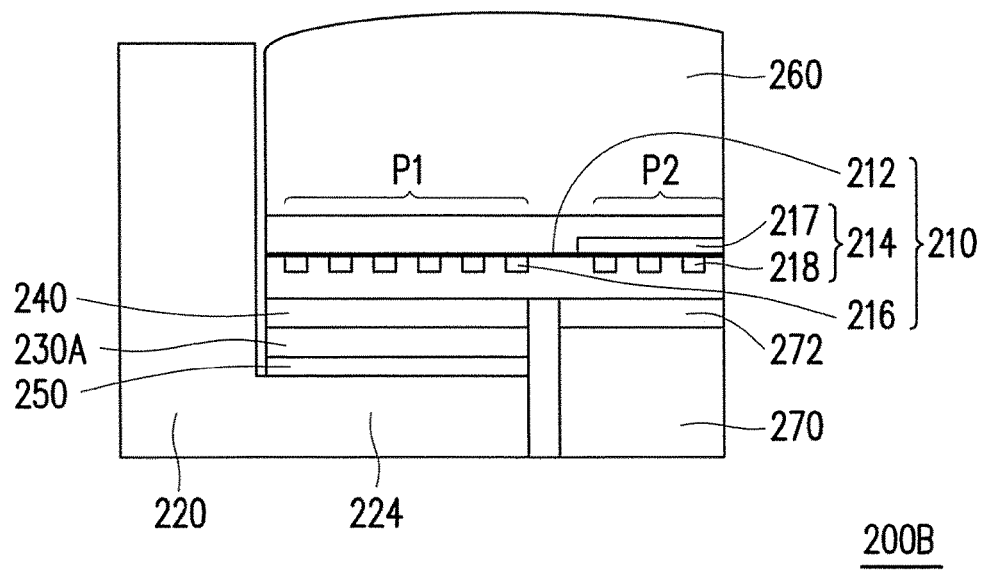
FIG. 4 is a partially enlarged cross-sectional diagram illustrating a multi-sensing system according to another embodiment of the invention.

FIG. 4 is a partially enlarged cross-sectional diagram illustrating a multi-sensing system according to another embodiment of the invention. Referring to FIG. 4, a multi-sensing system 200B of the present embodiment is similar to the multi-sensing system 200A of FIG. 3. A main difference between the two lies in that the multi-sensing system 200B further includes a second buffer 250 disposed between the grounding electrode 230A and the carrying shoulder 224. After the user applies a force to the multi-sensing system 200B, the first buffer 240 located between the force-sensing circuit 216 and the grounding electrode 230A and the second buffer 250 located between the grounding electrode 230A and the carrying shoulder 224 are simultaneously subjected to the force and are compressed. Therefore, a distance between the force-sensing circuit 216 and the grounding electrode 230A varies, such that the force-sensing circuit 216 senses a capacitance variation value according to the variation. On the other hand, the second buffer 250 located between the grounding electrode 230A and the carrying shoulder 224 buffers and protects the grounding electrode 230A and the carrying shoulder 224. Specifically, after the user applies the force to the multi-sensing system 200B, the force-sensing circuit 216 shifts towards the carrying shoulder 224, and the grounding electrode 230A simultaneously shifts towards the carrying shoulder 224 (but by a range of shift smaller than that of the force-sensing circuit 216), such that the distance between the force-sensing circuit 216 and the grounding electrode 230A disposed on the carrying shoulder 224 is shortened and causes the capacitance value to vary. Accordingly, the multi-sensing system 200B can execute one of a plurality of commands corresponding to a touch position according to a sensing result of the force-sensing circuit 216. Since the multi-sensing system 200B of the present embodiment includes the first buffer 240 and the second buffer 250, a two-phase compression space is provided to enhance a range value to be sensed. Therefore, the multi-sensing system 200B achieves better sensing effect in force sensing, and durability of the multi-sensing system 200B is enhanced. The multi-sensing system 200B of the present embodiment also achieves the foregoing effects and advantages, which shall not be repeatedly described here.

Figure 5:
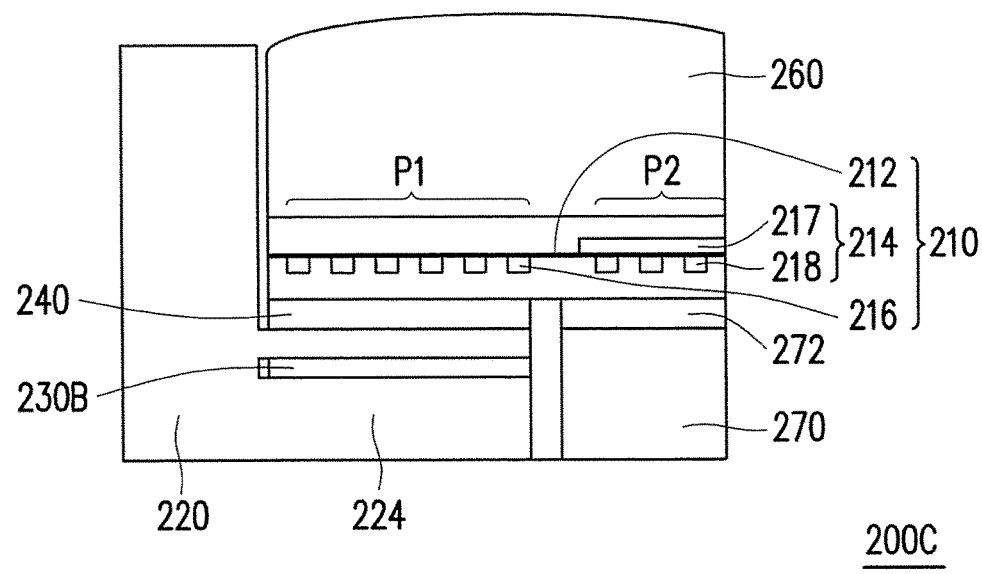
FIG. 5 is a partially enlarged cross-sectional diagram illustrating a multi-sensing system according to another embodiment of the invention.

FIG. 5 is a partially enlarged cross-sectional diagram illustrating a multi-sensing system according to another embodiment of the invention. Referring to FIG. 5, a multi-sensing system 200C of the present embodiment is similar to the multi-sensing system 200A of FIG. 3. A main difference between the two lies in that a grounding electrode 230B of the multi-sensing system 200C is built in the carrying shoulder 224, wherein the first buffer 240 is located between the force-sensing circuit 216 and the carrying shoulder 224. After the user applies a force to the multi-sensing system 200C, the first buffer 240 located between the force-sensing circuit 216 and the grounding electrode 230A is subjected to the force and is compressed. Therefore, a distance between the force-sensing circuit 216 and the grounding electrode 230B varies, such that the force-sensing circuit 216 senses a capacitance variation value according to the variation. Specifically, after the user applies the force to the multi-sensing system 200C, the force-sensing circuit 216 shifts towards the carrying shoulder 224, such that the distance between the force-sensing circuit 216 and the grounding electrode 230B disposed in the carrying shoulder 224 is shortened and causes the capacitance value to vary. Accordingly, the multi-sensing system 200C can execute one of a plurality of commands corresponding to a touch position according to a sensing result of the force-sensing circuit 216. Since the grounding electrode 230B of the multi-sensing system 200C of the present embodiment is built in the carrying shoulder 224, it is easier to assemble the sensing sheet 210 and the carrier 220 of the multi-sensing system 200C. The multi-sensing system 200C of the present embodiment also achieves the foregoing effects and advantages, which shall not be repeatedly described here.

Figure 6:
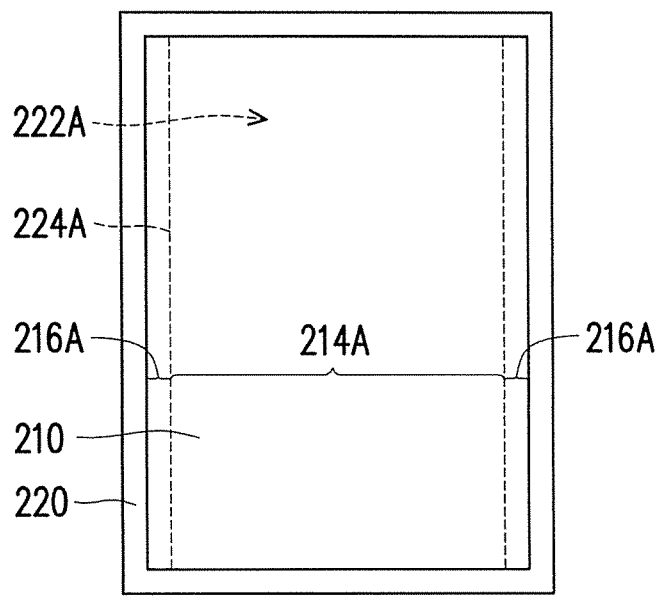
FIG. 6 is a top schematic diagram illustrating a multi-sensing system according to an embodiment of the invention.

FIG. 6 is a top schematic diagram illustrating a multi-sensing system according to an embodiment of the invention. Referring to FIG. 6, a multi-sensing system 200D illustrated in FIG. 6 is applicable to the portable electronic device 300 of FIG. 2. In the present embodiment, a carrying shoulder 224A is located at two opposite sides of a carrying space 222A. A force-sensing circuit 216A in the sensing sheet 210 is located at two opposite sides of the sensing sheet 210, and the force-sensing circuit 216A is located on the carrying shoulder 224A. Specifically, in the multi-sensing system 200D of the present embodiment, the force-sensing circuit 216A is manufactured at the two opposite sides of the sensing sheet 210 and corresponds to the carrying shoulder 224A located at the two opposite sides of the carrying space 222A. Accordingly, after the user applies a force to the multi-sensing system 200D, a distance between the force-sensing circuit 216A and the carrying shoulder 224A is shortened, such that the force-sensing circuit 216A senses a force sensing result. In the present embodiment, since the carrying shoulder 224A only needs to be disposed at the two opposite sides of the carrying space 222A and the force-sensing circuit 216A only needs to be disposed at the two opposite sides of the sensing sheet 210, the manufacturing costs for the multi-sensing system 200D are lowered, and the carrying space 222A is larger.

Figure 7:
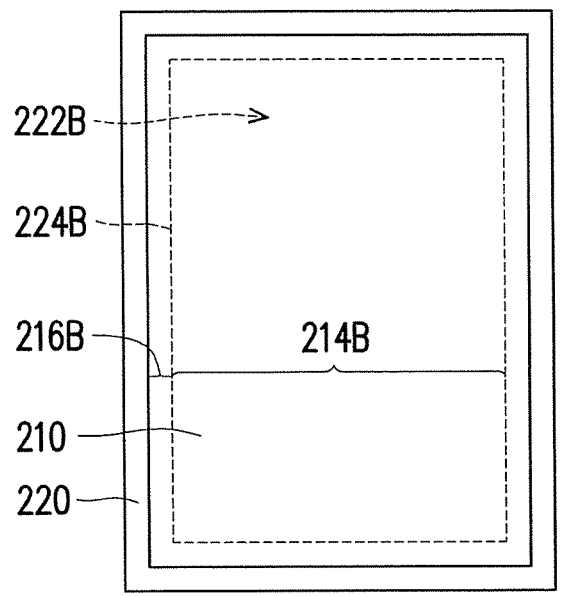
FIG. 7 is a top schematic diagram illustrating a multi-sensing system according to another embodiment of the invention.

FIG. 7 is a top schematic diagram illustrating a multi-sensing system according to another embodiment of the invention. Referring to FIG. 7, a multi-sensing system 200E of the present embodiment is similar to the multi-sensing system 200D of FIG. 6. A main difference between the two lies in that a carrying shoulder 224B in the multi-sensing system 200E is located on a periphery of the carrying space 222B. For example, the carrying shoulder 224B surrounds the entire periphery of the carrying space 222B. A force-sensing circuit 216B in the sensing sheet 210 is located on a periphery of the sensing sheet 210, and the force-sensing circuit 216B is located on the carrying shoulder 224B. Since the force-sensing circuit 216B is located on the periphery of the carrying space 222B, wherever the user applies the force, a more uniform and accurate sensing result is obtained. The multi-sensing system 200E of the present embodiment also achieves the foregoing effects and advantages, which shall not be repeatedly described here.

Figure 8:
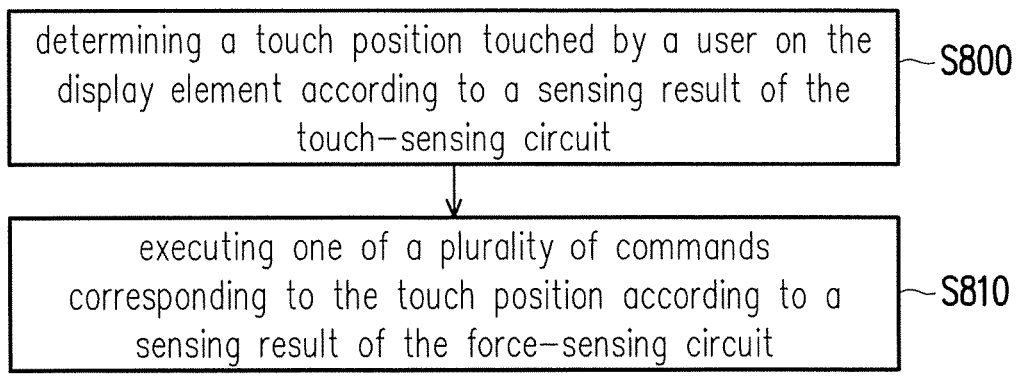
FIG. 8 is a flowchart illustrating a touch-sensing method applicable to a portable electronic device according to an embodiment of the invention.

FIG. 8 is a flowchart illustrating a touch-sensing method applicable to a portable electronic device according to an embodiment of the invention. Referring to FIG. 2 and FIG. 8, the touch-sensing method of the present embodiment is applicable to the portable electronic device 300 of FIG. 2 or other portable electronic devices that are in line with the concept of the invention. In step S800, according to a sensing result of the touch-sensing circuit 214, a touch position touched by a user on the display element 270 is determined. Next, in step S810, according to a sensing result of the force-sensing circuit 216, one of a plurality of commands corresponding to the touch position is executed. Since the touch-sensing method of the present embodiment adopts the sensing sheet 210 incorporating the touch-sensing circuit 214 and the force-sensing circuit 216, it is not necessary to additionally dispose a force-sensing sheet 112 or a touch-sensing sheet 114, as illustrated in FIG. 1. Moreover, the configuration of the sensing sheet 210 of a single-layer structure lowers the manufacturing costs for the portable electronic device 300 and makes the portable electronic device 300 lighter and thinner.

In summary of the above, in the multi-sensing system, the portable electronic device, and the touch-sensing method of the invention, the force-sensing circuit is disposed between the substrate and the carrying shoulder adjacent to the carrying space. The force-sensing circuit and the touch-sensing circuit are integrated on one single substrate. By touching the portable electronic device, the distance between the force-sensing circuit and the carrying shoulder varies. According to this variation, the capacitance variation value is sensed and the magnitude of the applied force is determined. Moreover, according to the sensing result, one of the plurality of commands corresponding to the touch position is executed, thereby achieving the purpose of triggering different functions by applying forces of different magnitudes. Since it is not necessary to additionally dispose a force-sensing sheet, the manufacturing costs for the portable electronic device are lowered and the size is reduced. In addition, when the portable electronic device of the invention further includes the buffer, the multi-sensing system achieves even better force sensing effect, and durability of the multi-sensing system is enhanced.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. A multi-sensing system comprising:
   a sensing sheet comprising a substrate, and a touch-sensing circuit and a force-sensing circuit disposed on the substrate, wherein an orthogonal projection of the force-sensing circuit on the substrate and an orthogonal projection of the touch-sensing circuit on the substrate are misaligned from each other;
   a carrier having a carrying space and a carrying shoulder adjacent to the carrying space, wherein the carrier carries the sensing sheet with the carrying shoulder, the carrying space is used to accommodate a display element, and the touch-sensing circuit is located above the display element; and
   a grounding electrode and a first buffer, wherein the first buffer is located between the force-sensing circuit and the grounding electrode, the grounding electrode is built in the carrying shoulder, and the first buffer is located between the force-sensing circuit and the carrying shoulder.

2. The multi-sensing system according to claim 1, wherein the carrying shoulder is located at two opposite sides of the carrying space.

3. The multi-sensing system according to claim 1, wherein the carrying shoulder surrounds the carrying space.

4. The multi-sensing system according to claim 1, further comprising a glass cover plate, wherein the sensing sheet is disposed on the glass cover plate, and the sensing sheet is located between the glass cover plate and the carrying shoulder.

5. The multi-sensing system according to claim 1, wherein a material of the carrier is a metal.

6. A portable electronic device comprising:
   a display element; and
   a multi-sensing system comprising:
     a sensing sheet comprising a substrate, and a touch-sensing circuit and a force-sensing circuit disposed on the substrate, wherein an orthogonal projection of the force-sensing circuit on the substrate and an orthogonal projection of the touch-sensing circuit on the substrate are misaligned from each other;
     a carrier having a carrying space and a carrying shoulder adjacent to the carrying space, wherein the carrier carries the sensing sheet with the carrying shoulder, the carrying space is used to accommodate the display element, and the touch-sensing circuit is located above the display element; and
     a grounding electrode and a first buffer, wherein the first buffer is located between the force-sensing circuit and the grounding electrode, the grounding electrode is built in the carrying shoulder, and the first buffer is located between the force-sensing circuit and the carrying shoulder.

7. The portable electronic device according to claim 6, wherein the carrying shoulder is located at two opposite sides of the carrying space.

8. The portable electronic device according to claim 6, wherein the carrying shoulder surrounds the carrying space.

9. The portable electronic device according to claim 6, wherein the multi-sensing system further comprises a glass cover plate, the sensing sheet is disposed on the glass cover plate, and the sensing sheet is located between the glass cover plate and the carrying shoulder.

10. The portable electronic device according to claim 6, wherein a material of the carrier is a metal.

11. The portable electronic device according to claim 6, further comprising an optical adhesive disposed between the sensing sheet and the display element.

12. A touch-sensing method for touch-sensing the portable electronic device according to claim 6, the touch-sensing method comprising:

determining a touch position touched by a user on the display element according to a sensing result of the touch-sensing circuit; and executing one of a plurality of commands corresponding to the touch position according to a sensing result of the force-sensing circuit.

\* \* \* \* \*